Nov. 9, 1937.  C. F. MASON ET AL  2,098,348
HANDLE ADJUSTMENT FOR BROOMS AND SIMILAR IMPLEMENTS
Filed Aug. 29, 1936
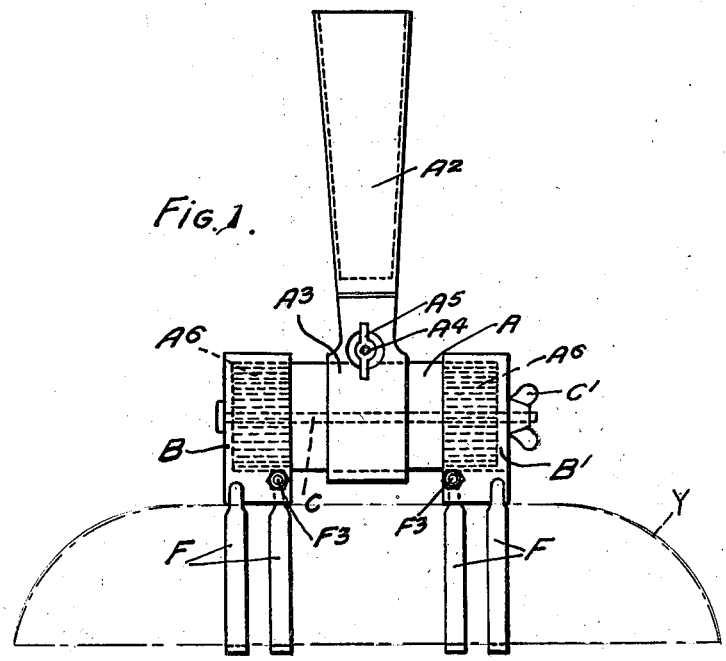
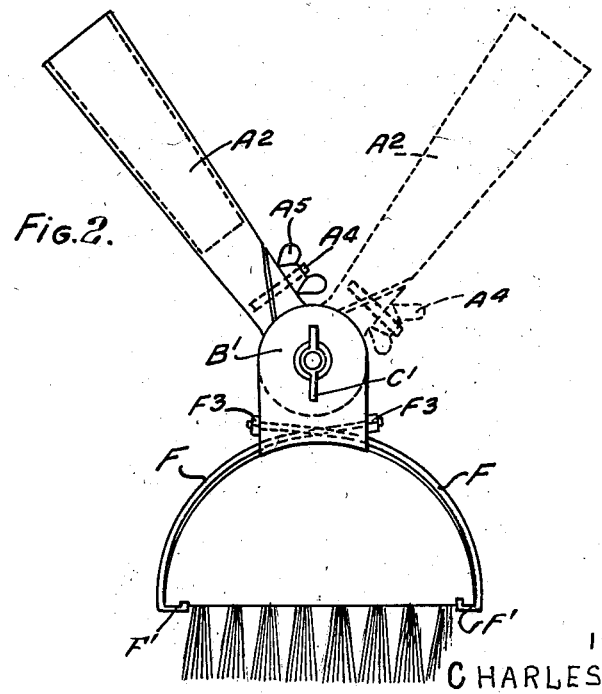
INVENTORS.
CHARLES F. MASON
HUGH CHARLES L. MASON
ATTORNEY Patented Nov. 9, 1937

2,098,348

UNITED STATES PATENT OFFICE 2,098,348

HANDLE ADJUSTMENT FOR BROOMS AND SIMILAR IMPLEMENTS

Charles Frederick Mason and Hugh Charles Lewis Mason, Caversham, Reading, England Application August 29, 1936, Serial No. 98,614
In Great Britain August 29, 1935

4 Claims. (Cl. 306—17)

This invention relates to handle attachments for brooms, rakes, mops, hoes, drags, deck-scrubbers and similar implements and refers to that class of devices wherein the handle can be quickly adjusted to any desired angle relatively to the head or stock of the implement, to suit the convenience of the user, or the nature or state of wear of the implement.

According to the present invention, the attachment comprises a longitudinal support in the form of a round or cylindrical bar or rod, furnished with external longitudinal serrations extending to both of its ends, and mounted in end brackets or bearings furnished with internal serrations and which can be secured to the stock or head of the implement together with a handle socket provided with a clamp adapted to surround the said bar or rod and provided with locking devices for securing the clamp in any position of angular adjustment.

According to the invention also the attachment may be detachably secured to the head or stock of the implement by adjustable clamps mounted on the attachment and adapted to grip said head or stock.

The invention will be hereinafter described as applied to a broom or similar implement.

In the accompanying drawing:

Figure 1 is a side elevation showing the invention applied to a broom, and

Fig. 2 is an elevation of the attachment illustrated in Fig. 1.

In the embodiment of the invention illustrated, the supporting member or rod A is separated from the socket for the broom handle. This socket $A^2$ is furnished with a split or open boss $A^3$ which loosely embraces the supporting rod A, and a bolt $A^4$ mounted in one side of this split boss passes through an opening in the other side and is furnished with an adjusting bolt and nut $A^5$. By loosening this nut the boss $A^3$ is freed from the rod A and the socket and handle can then be adjusted angularly to the attachment and to the broom stock.

When this angular adjustment has been made the parts can be locked by tightening the nut, to cause the boss $A^3$ to be clamped tightly on to the rod A.

In this example, the rod A is furnished externally at each end with a series of teeth or serrations $A^6$, and the brackets B, $B^1$ are each furnished internally with a series of corresponding teeth or serrations. When the brackets B, $B^1$ are placed on the ends of the rod A, the parts can be locked together by tightening a nut $C^1$ mounted on one end of a bolt C which passes from the outer end of the bracket B, through the member A to the outer end of the bracket $B^1$.

These parts A, B, $B^1$ being detachable, provide ready means for assembling the device or taking it apart for renewal or replacement of parts or of the handle with its socket and clamp.

The clamps or clamping bars F, F for embracing the stock Y are mounted in the brackets B, $B^1$.

The invention is shown applied to a broom having a stock or head of well known shape. It is adapted to be detachably connected to this head Y by means of adjustable clamps. Two pairs of clamps are employed, one pair being mounted in or on each of the brackets B and $B^1$. These clamps comprise two arms bent to conform to the shape of the broom-stock Y, the outer or lower end of each arm being bent at $F^1$ to grip the edge of the broom-stock. The upper ends of these clamps are led through openings in the brackets B and $B^1$ and secured by adjusting nuts $F^3$.

The invention is applicable to broom-stocks of known shape, as shown, but this form of stock has been adopted, because hitherto it has had to be of sufficient substance for a hole to be bored therein for the receipt of the end of the broom handle. As this hole is not necessary for the present invention, the head stock employed may be of flat or any other appropriate shape or size.

By means of this invention, the handle of a broom or other implement can be readily and quickly adjusted and fixed in any desired angular position relatively to the implement, to suit the convenience of the user, to enable the implement to be properly applied to the surface on which it is working, or to adjust the implement to compensate for irregular wear thereof.

What we claim is:—

1. In an adjustable handle for brooms and like implements provided with a head, the combination of a horizontal supporting rod having external parallel serrations on the outer surface thereof, supporting brackets for the ends of the rod having internal serrations within the same, means for connecting the brackets to the head of the implement, a handle and receiving socket, and a clamp on the said socket adjustably mounted on the said horizontal rod.

2. In an adjustable handle for brooms and like implements provided with a head, the combination of a horizontal supporting rod having external parallel serrations on the outer surface thereof, a supporting bracket for each end of the said rod having corresponding internal serrations within the same, means for detachably securing the brackets on the horizontal rod, means for detachably securing the said brackets to the head of the implement, a handle-receiving socket, an adjustable clamp on the said socket mounted on the horizontal rod, and means for locking the clamp to the said rod.

3. In an adjustable handle for brooms and like implements provided with a head stock, the combination of a horizontal and supporting rod having external parallel serrations extending to both ends thereof, a carrying bracket for each end of the said rod having corresponding internal serrations within the same, a locking bolt passing through each bracket and through the rod, a securing nut on one end of the bolt, a handle-receiving socket, a split-ring clamp on the socket and embracing said horizontal rod, a clamping screw for the clamp, and adjustable means for securing the brackets to the head stock of the implement.

4. In an adjustable handle for brooms and like implements provided with a stock, the combination of a horizontal supporting rod having external parallel serrations extending to both ends thereof, a carrying bracket for each end of the said rod having corresponding serrations in the rod-receiving opening thereof, a bolt passing through both brackets and through the rod, an adjustable nut on one end of the bolt, a pair of gripping arms on each bracket for securing them to the stock of the implement, adjusting nuts for the gripping arms, a handle-receiving socket, a split-ring clamp on the said socket surrounding the said rod, and a clamping screw on the said clamp.

CHARLES FREDERICK MASON.
HUGH CHARLES LEWIS MASON.